US012609513B2

(12) United States Patent
Ogura

(10) Patent No.: US 12,609,513 B2
(45) Date of Patent: Apr. 21, 2026

(54) GRIPPING TOOL

(71) Applicant: NAGAKI SEIKI CO., LTD., Daito (JP)

(72) Inventor: Takashi Ogura, Osaka (JP)

(73) Assignee: NAGAKI SEIKI CO., LTD., Daito (JP)

( * ) Notice: Subject to any disclaimer, the term of this patent is extended or adjusted under 35 U.S.C. 154(b) by 1051 days.

(21) Appl. No.: 17/754,596

(22) PCT Filed: Feb. 9, 2021

(86) PCT No.: PCT/JP2021/004852
§ 371 (c)(1),
(2) Date: Apr. 6, 2022

(87) PCT Pub. No.: WO2021/176973
PCT Pub. Date: Sep. 10, 2021

(65) Prior Publication Data
US 2024/0083020 A1 Mar. 14, 2024

(30) Foreign Application Priority Data

Mar. 2, 2020 (JP) ................................. 2020-034591

(51) Int. Cl.
*H02G 1/04* (2006.01)
*B25B 5/04* (2006.01)
*B25B 25/00* (2006.01)
(52) U.S. Cl.
CPC ................. *H02G 1/04* (2013.01); *B25B 5/04* (2013.01); *B25B 25/00* (2013.01)

(58) Field of Classification Search
CPC .............. H02G 1/04; B25B 5/04; B25B 25/00
See application file for complete search history.

(56) References Cited

U.S. PATENT DOCUMENTS

| | | | | |
|---|---|---|---|---|
| 1,942,625 A | * | 1/1934 | Whalan | F16G 3/006 24/132 R |
| 2,985,933 A | * | 5/1961 | Peterson | H01R 11/15 24/132 R |
| 3,599,297 A | * | 8/1971 | Sievers | F16G 11/101 24/132 R |

FOREIGN PATENT DOCUMENTS

| | | | | |
|---|---|---|---|---|
| CN | 104904082 | 9/2015 | | |
| JP | 11-004510 | 1/1999 | | |
| JP | 2000134742 | * | 5/2000 | ............... H02G 1/04 |

(Continued)

*Primary Examiner* — Andrew J Marien
(74) *Attorney, Agent, or Firm* — Fay Kaplun & Marcin, LLP

(57) ABSTRACT
A wire gripper includes a second link arm, a connection member, a stationary-side wire gripping portion, and a moveable-side wire gripping portion. The second link arm is rotatably connected by a main body. The connection member is connected to the second link arm. The moveable-side wire gripping portion is movable in a direction approaching or being spaced from the stationary-side wire gripping portion in conjunction with movement of the connection member. The wire gripper includes a ratchet mechanism that blocks rotation of the operation lever in conjunction with rotation of the second link arm in one direction and allows reverse rotation in the other direction. The ratchet mechanism blocks rotation, so that movement of the moveable-side wire gripping portion in a direction being spaced from the stationary-side wire gripping portion.

8 Claims, 8 Drawing Sheets

(56) References Cited

FOREIGN PATENT DOCUMENTS

| | | |
|----|------------|---------|
| JP | 2004-242477 | 8/2004 |
| JP | 3180307 U | 12/2012 |
| JP | 2013-176285 | 9/2013 |
| WO | 2014/050171 | 4/2014 |

* cited by examiner

FIG. 7

FIRST MODIFICATION

SECOND MODIFICATION

GRIPPING TOOL

PRIORITY DATA

The present application is a 371 application of PCT Patent Application Serial No. PCT/JP2021/004852 filed on Feb. 9, 2021 which claims priority to Japanese Patent Application Serial No. 2020-034591 filed on Mar. 2, 2020. The disclosure of the above applications is incorporated herein by reference.

TECHNICAL FIELD

The present invention relates to a gripping tool.

BACKGROUND ART

A gripping tool that is attached to a linear body by holding the linear body being gripped has been conventionally known. PTL 1 discloses an electric wire gripping portion of an electric wire cutting tool serving as this kind of gripping tool.

The electric wire gripping portion of PTL 1 includes a mounting portion integrally formed with a receiving piece, two swing levers, and a gripping portion. Each of the two swing levers is rotatably supported by a mounting portion on one end side of the two swing levers. Rotation of the two swing levers in one direction allows the gripping portion to grip an electric wire between the gripping portion and a receiving piece. A wire gripper further includes a lock means that regulates rotation of an action portion in the other direction, in order to prevent releasing of gripping of the linear body. Rotation operation of an operation ring allows the lock means to work on one of the two swing levers, and regulates rotation so that one of the two swing levers does not rotate.

CITATION LIST

Patent Literature

PTL 1: Japanese Patent Application Laid-Open No. 2013-176285

Problems to be Solved by the Invention

In the above-described configuration of PTL 1, the lock means typically has a screw shaft provided such that its advance-retreat movement can be operated with respect to a part of one of the two swing levers, and is configured that forward movement operation of the screw shaft allows a distal end of the screw shaft to come in contact with one of the two swing levers thereby regulating rotation of one of the two swing levers in the other direction. Therefore, rotation operation of the screw shaft is required when the lock means is used for regulating the rotation of one of the swing levers. Thus, when the wire gripper is mounted to linear body, the rotation operation of the screw shaft is very troublesome and there is a room for improvement.

The present invention relates to a gripping tool capable of regulating rotation of a link member with a simple operation.

Means for Solving the Problems and Effects Thereof

Problems to be solved by the present invention are as described above, and next, means for solving the problems and effects thereof will be described.

In an aspect of the present invention, a gripping tool having the following configuration is provided. That is, the gripping tool includes a main body, a link member, a connection member, a stationary-side gripping portion, and a moveable-side gripping portion. The link member is rotatably supported by the main body. The connection member is connected to the link member. The stationary-side gripping portion is provided in the main body. The moveable-side gripping portion is connected to the link member so as to face the stationary-side gripping portion, and is movable in a direction approaching or being separated from the stationary-side gripping portion in conjunction with movement of the connection member. In the gripping tool, the stationary-side gripping portion and the moveable-side gripping portion grip and hold a linear body. The gripping tool includes a one-way clutch that blocks rotation of the link member or another member in conjunction with rotation of the link member in one direction and allows reverse rotation in the other direction. The one-way clutch blocks the rotation, so that movement in one of a direction in which the moveable-side gripping portion approaches the stationary-side gripping portion and a direction in which the moveable-side gripping portion is spaced from the stationary-side gripping portion is regulated.

Accordingly, the one-way clutch is used to substantially regulate rotation of the link member. This leads to excellent workability. When the thickness of the linear body varies, rotation can be certainly regulated.

The gripping tool is preferably configured as follows. That is, the gripping tool includes an operation portion rotatably provided in the connection member. The operation portion has a contact part capable of coming in contact with the link member. The contact part moves along an arc-shaped path in accordance with operation of the operation portion. The link member presses the contact part in conjunction with movement of the moveable-side gripping portion in a direction in which the moveable-side gripping portion is spaced from the stationary-side gripping portion, when the contact part comes in contact with the link member. The one-way clutch blocks rotation of the operation portion in conjunction with pressing of the contact part by the link member, and allows reverse rotation of the operation portion in conjunction with pressing of the contact part by the link member.

Accordingly, double locking by the contact part and the one-way clutch can be easily achieved.

The gripping tool preferably includes a biasing member that biases rotation of the operation portion in a direction in which the contact part approaches the link member.

Accordingly, the above-described double locking can be achieved only by rotation of the link member without rotation operation of the operation portion.

In the gripping tool, it is preferable to perform a switching operation that releases rotation blocking by the one-way clutch or a switching operation that reverses a direction of rotation blocking.

Accordingly, rotation regulation of the link member can be easily released.

The gripping tool is preferably configured as follows. That is, the one-way clutch includes a ratchet wheel, a claw member, and an elastic member. The ratchet wheel is arranged fixedly to the connection member. The claw member is rotatably supported relative to the operation portion. The elastic member causes an elastic force working on the claw member.

Accordingly, the one-way clutch can be achieved with a simple configuration.

The gripping tool is preferably configured as follows. That is, the gripping tool includes a plurality of the link members. The main body, the link member, and the connection member form a parallel link mechanism.

Accordingly, since a posture of the connection member does not change regardless of rotation of the link member, rotation regulation of the link member can be certainly executed, with a simple configuration.

BRIEF DESCRIPTION OF THE DRAWINGS

FIG. 7 is a side view of a first modification of a wire gripper.

DETAILED DESCRIPTION

Figure 1:
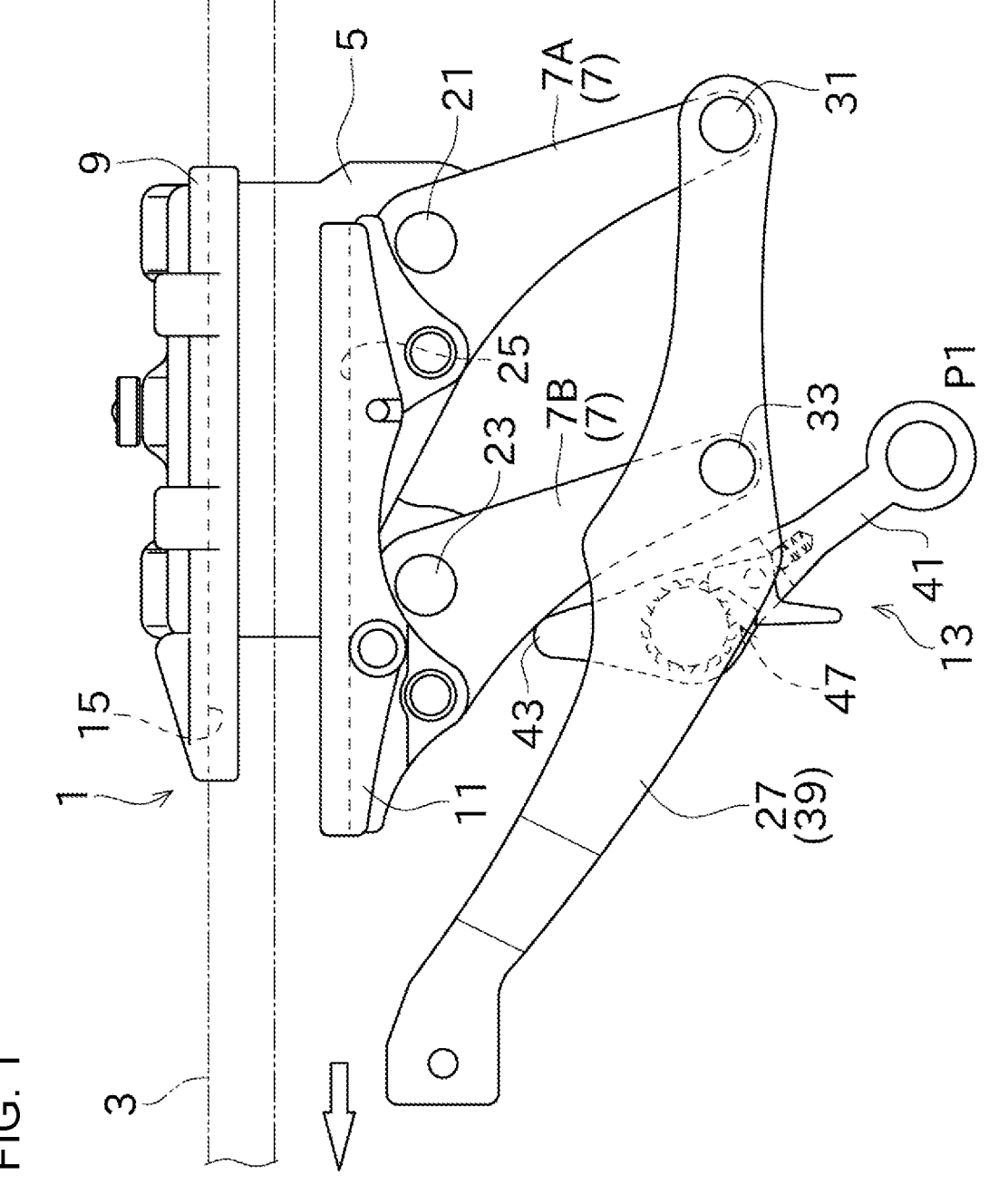
FIG. 1 is a side view of an overall configuration of a wire gripper according to one embodiment of the present invention.

Next, an embodiment of the present invention will be described with reference to drawings. Firstly, one embodiment of the present invention will be described with reference to FIG. 1. FIG. 1 is a side view of an overall configuration of a wire gripper 1 according to one embodiment of the present invention.

A wire gripper (gripping tool) 1 illustrated in FIG. 1 is a tool capable of gripping a linear body (an electric wire, a wire, and the like) 3. The wire gripper 1 is applied to a device (wire tensioning device) for tensioning the linear body 3 when the work is subjected to the linear body 3, for example. When such device is used, the wire gripper 1 grips the linear body 3 and is mounted to the linear body 3.

For example, in a work for an electric wire, the electric wire as the linear body 3 is tensioned in a horizontal direction. The wire gripper 1 is used for sandwiching the linear body 3 in the vertical direction. In the following, a longitudinal direction of the linear body 3 may be referred to as a front-rear direction, and a direction perpendicular to both the front-rear direction and a vertical direction may be referred to as a right-left direction. However, these terms are used for convenience, and does not limit a positional relationship of each component, and the like.

As illustrated in FIG. 1, the wire gripper 1 includes a main body 5, two link arms (link members) 7, a stationary-side wire gripping portion (stationary-side gripping portion) 9, a moveable-side wire gripping portion (moveable-side gripping portion) 11, and a regulating portion 13.

The main body 5 is a base portion to which various components constituting the wire gripper 1 are mounted. The stationary-side wire gripping portion 9 is integrally formed with the main body 5.

The stationary-side wire gripping portion 9 extends in the front-rear direction. A first groove 15 that is elongated in the front-rear direction is formed on a lower surface of the stationary-side wire gripping portion 9. The first groove 15 in which its lower part is opened can accommodate an upper part of the linear body 3.

The two link arms 7 are arranged at an appropriate interval in the front-rear direction. The two link arms 7 each have substantially the same configuration. In the following, one of the two link arms 7 which is positioned on one side in the front-rear direction is referred to as a first link arm 7A, and the other of the two link arms 7 which is positioned on the other side in the front-rear direction is referred to as a second link arm 7B.

Each of the first link arm 7A and the second link arm 7B protrudes downward from the main body 5. The first link arm 7A is supported by the main body 5 so as to be rotated around a first shaft 21. The second link arm 7B is supported by the main body 5 so as to be rotated around a second shaft 23.

The moveable-side wire gripping portion 11 extends in the front-rear direction. A second groove 25 that is elongated in the front-rear direction is formed on an upper surface of the moveable-side wire gripping portion 11. The second groove 25 in which its upper part is opened can accommodate a lower part of the linear body 3.

The moveable-side wire gripping portion 11 is disposed below the stationary-side wire gripping portion 9. The moveable-side wire gripping portion 11 is disposed so that the opened part of the second groove 25 faces the opened part of the first groove 15 of the stationary-side wire gripping portion 9 in the vertical direction.

The moveable-side wire gripping portion 11 is disposed above each of the first shaft 21 and the second shaft 23. The moveable-side wire gripping portion 11 connects a part of the first link arm 7A spaced toward one side in the front-rear direction with respect to the first shaft 21 and a part of the second link arm 7B spaced toward one side in the front-rear direction with respect to the second shaft 23. The moveable-side wire gripping portion 11 is rotatably mounted to the first link arm 7A and the second link arm 7B, respectively. The main body 5, the first link arm 7A, the second link arm 7B, and the moveable-side wire gripping portion 11 form a parallel link mechanism.

A connection member 27 is provided so as to connect a lower end portion of the first link arm 7A and a lower end portion of the second link arm 7B. The connection member 27 is elongated so that its longitudinal direction substantially is oriented in the front-rear direction.

A third shaft 31 is disposed in the first link arm 7A below the first shaft 21 at a distance. A fourth shaft 33 is disposed is disposed in the link arm 7B below the second shaft 23 at a distance. One end portion of the connection member 27 in its longitudinal direction is rotatably mounted to the third shaft 31. An intermediate portion of the connection member 27 in its longitudinal direction is rotatably mounted to the fourth shaft 33. The main body 5, the first link arm 7A, the second link arm 7B, and the connection member 27 form a parallel link mechanism.

The other end portion of the connection member 27 in its longitudinal direction can be connected to the above-described device (wire tensioning device). Such device can pull the connection member 27 connected to the device.

This configuration allows, in movement of the connection member 27, the first link arm 7A to be rotated around the first shaft 21, and the second link arm 7B to be rotated around the second shaft 23. Accordingly, the moveable-side wire gripping portion 11 connected to each of the first link arm 7A and the second link arm 7B moves substantially in the vertical direction so as to approach or be spaced from the stationary-side wire gripping portion 9. The moveable-side wire gripping portion 11 moves so as to approach the stationary-side wire gripping portion 9, so that the linear body 3 can be gripped and held by the stationary-side wire gripping portion 9 and the moveable-side wire gripping portion 11.

Hereinafter, in rotation directions of the first link arm 7A and the second link arm 7B, a direction in which the moveable-side wire gripping portion 11 approaches the stationary-side wire gripping portion 9 may be referred to as a "gripping direction", and a direction in which the moveable-side wire gripping portion 11 is spaced from the stationary-side wire gripping portion 9 may be referred to as a "release direction". In FIG. 1, the gripping direction is a clockwise direction, and the release direction is a counterclockwise direction.

The regulating portion 13 is provided between the second link arm 7B and the connection member 27. The regulating portion 13 regulates movement of the second link arm 7B (rotation around the second shaft 23) in the above-described parallel link mechanism, so that the moveable-side wire gripping portion 11 can be held without being unintendedly away from the stationary-side wire gripping portion 9.

Figure 2:
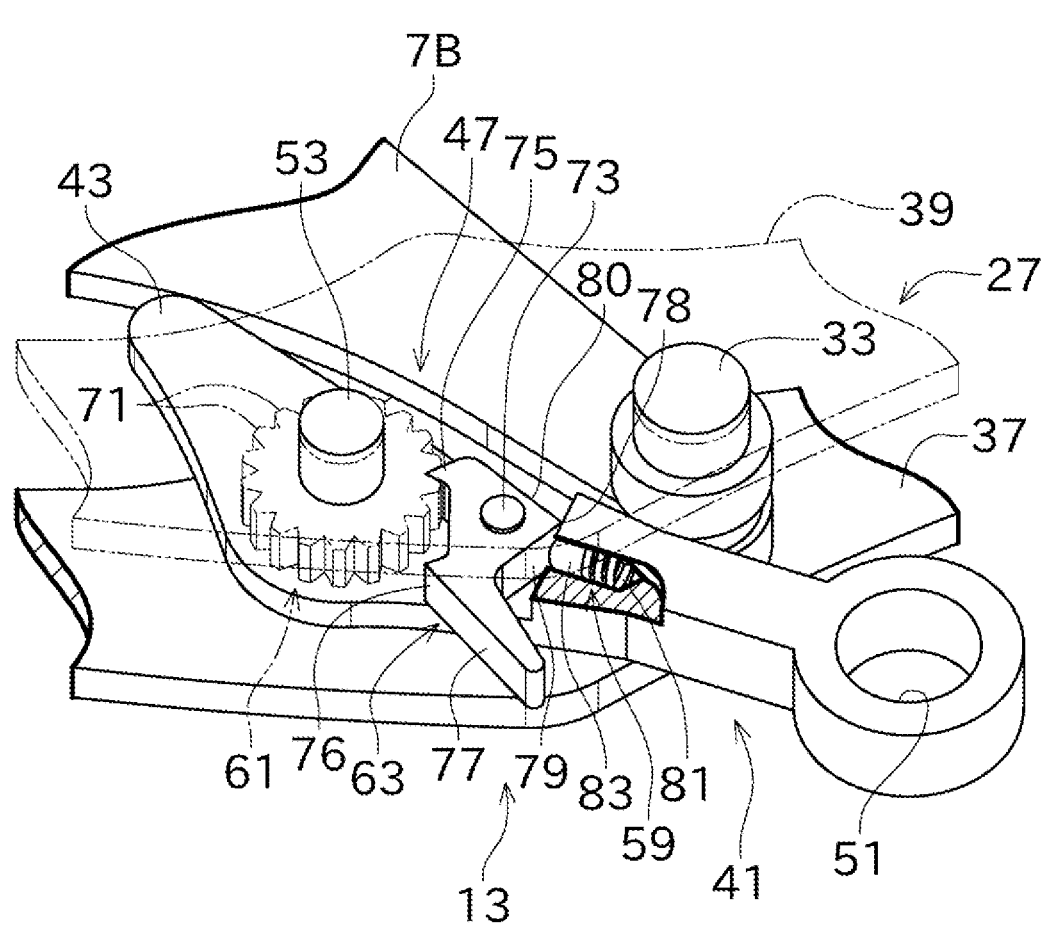
FIG. 2 is a cross-sectional perspective view illustrating details of a configuration of a regulating portion of the wire gripper.
Figure 3:
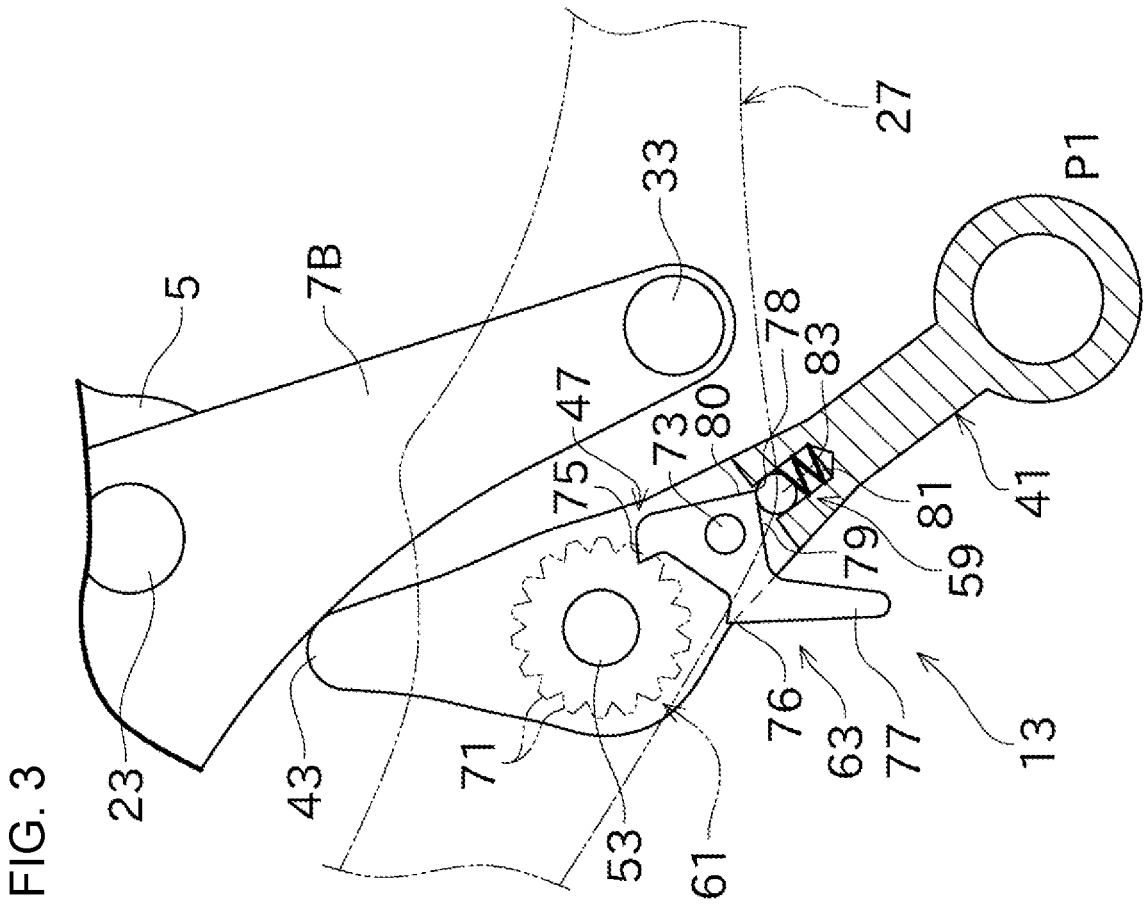
FIG. 3 is a cross-sectional view of the regulating portion in a state corresponding to FIG. 1.
Figure 4:
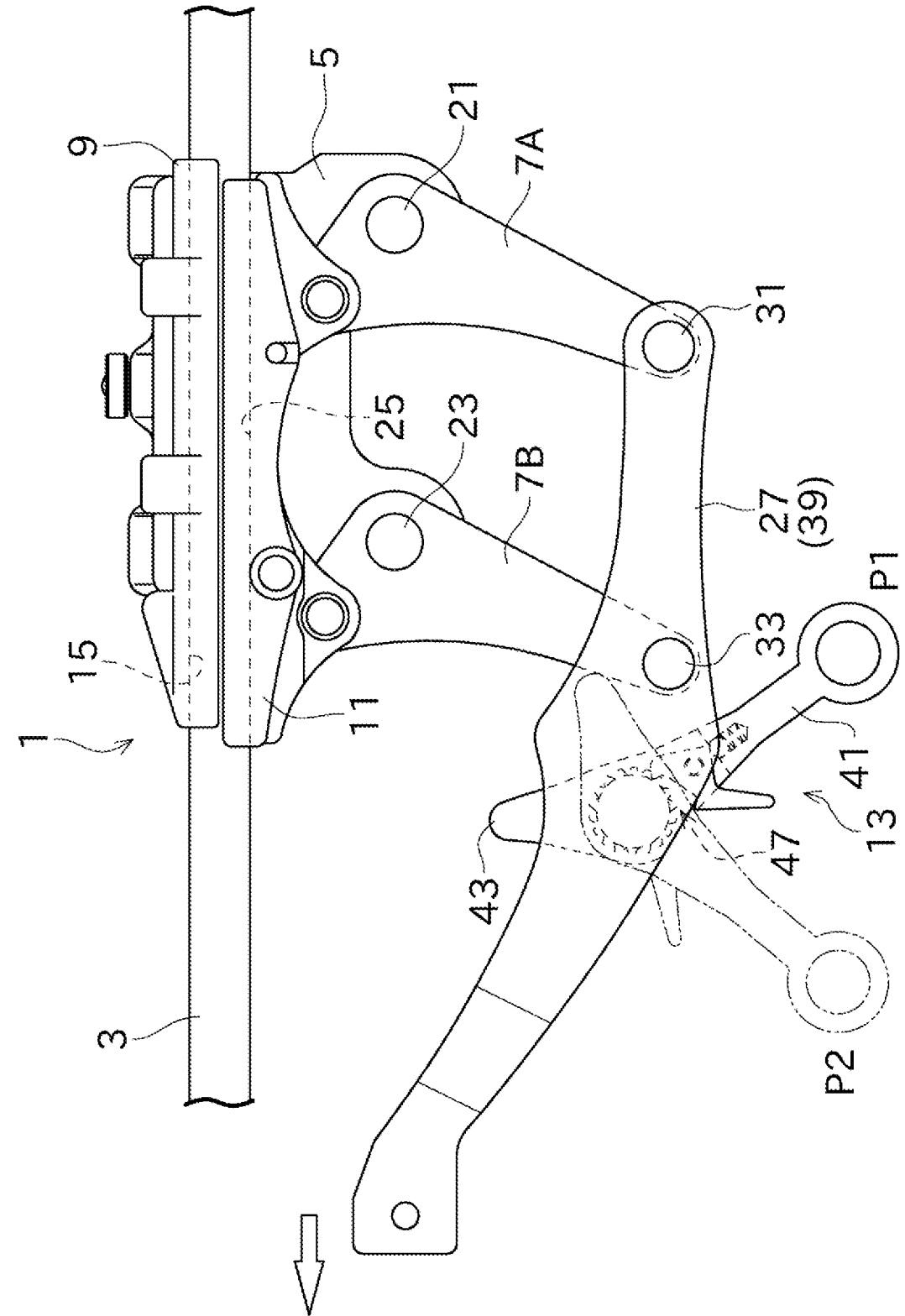
FIG. 4 is a side view of a situation in which a connection member is pulled and a linear body is gripped, changed from the state of FIG. 1.
Figure 5:
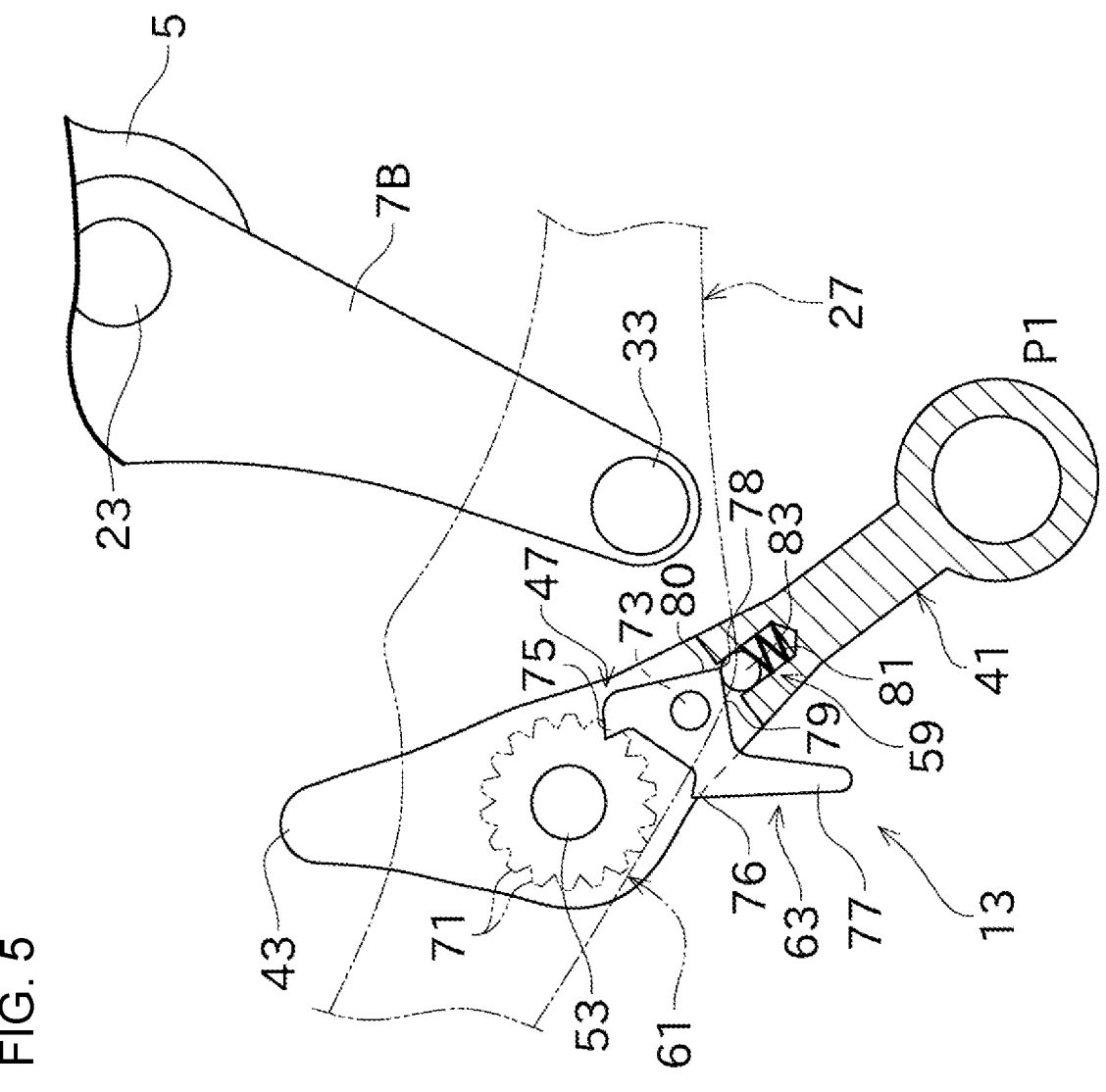
FIG. 5 is a cross-sectional view of a situation of the regulating portion before locking by an operation lever.
Figure 6:
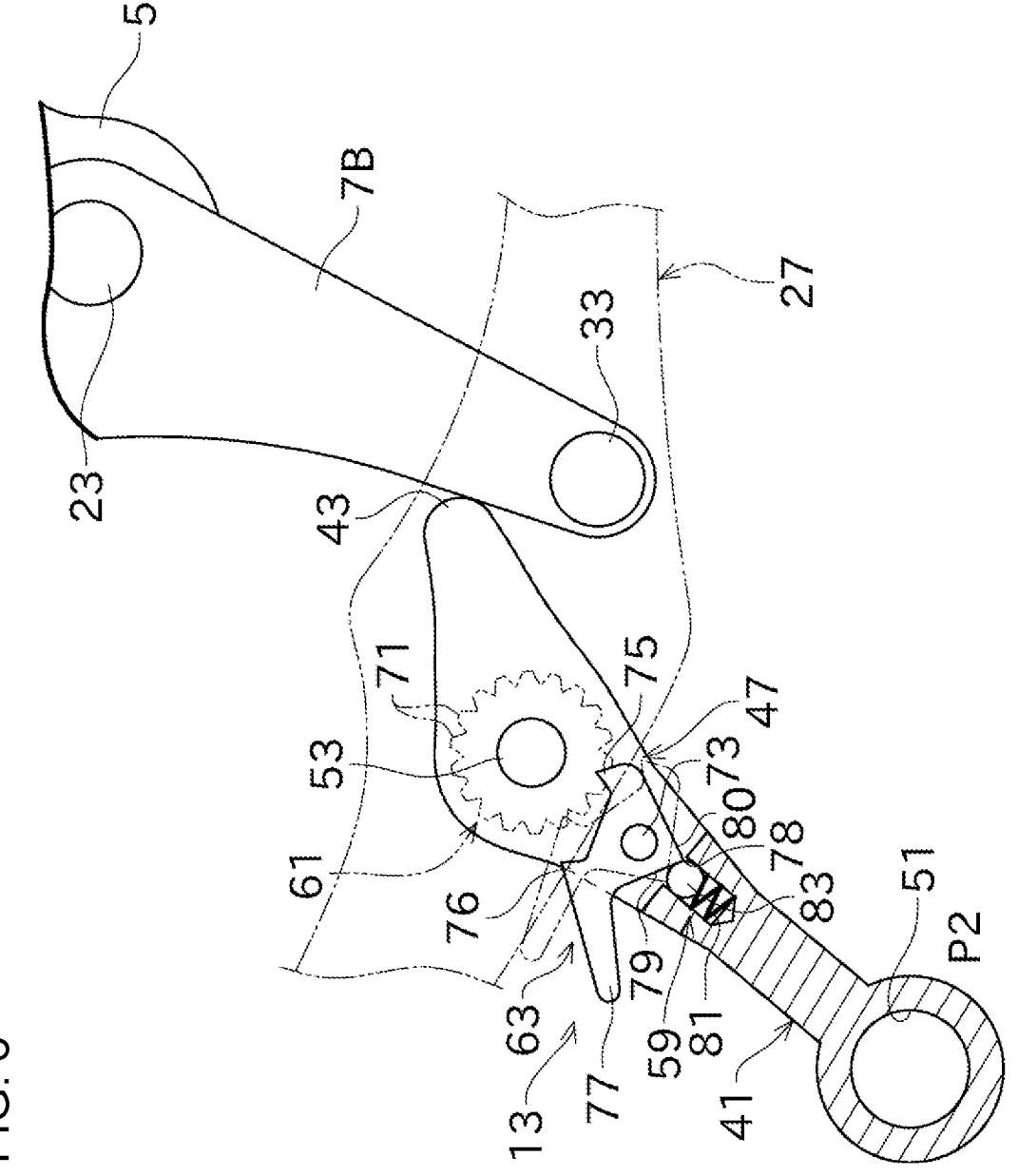
FIG. 6 is a cross-sectional view of a situation of the regulating portion after locking by the operation lever.

Next, a configuration of the regulating portion 13 will be described with reference to FIG. 2 to FIG. 6. FIG. 2 is a cross-sectional perspective view illustrating details of a configuration of the regulating portion 13 of the wire gripper 1. FIG. 3 is a cross-sectional view of the regulating portion 13 in a state corresponding to FIG. 1. FIG. 4 is a side view of a situation in which the connection member 27 is pulled and the linear body 3 is gripped, changed from the state of FIG. 1. FIG. 5 is a cross-sectional view of a situation of the regulating portion 13 before locking by an operation lever 41. FIG. 6 is a cross-sectional view of a situation of the regulating portion 13 after locking by the operation lever 41.

In the present embodiment, as illustrated in FIG. 2, the connection member 27 includes a first member 37 and a second member 39. The first member 37 and the second member 39 each have a shape corresponding to each other, and each have substantially a symmetrical shape. The first member 37 and the second member 39 are arranged at an appropriate interval in the right-left direction, and are fixed to each other. The lower end portion of the first link arm 7A and the lower end portion of the second link arm 7B are arranged in a space between the first member 37 and the second member 39. In FIG. 2, FIG. 3, and the like, a part of the connection member 27 or the entire connection member 27 is transparently indicated by a chain line, in order to easily recognize the configuration of the regulating portion 13.

The above-described regulating portion 13 is disposed in the space between the first member 37 and the second member 39, at a position corresponding to the intermediate portion of the connection member 27 in its longitudinal direction. As illustrated in FIG. 2 and FIG. 3, the regulating portion 13 has the operation lever (operation portion) 41 and a ratchet mechanism (one-way clutch) 47.

The operation lever 41 is formed as an elongated member. A rotation shaft 53 is mounted to an intermediate portion of the operation lever 41 in its longitudinal direction. The operation lever 41 is rotatably supported relative to the first member 37 and the second member 39 through the rotation shaft 53.

On end portion of the operation lever 41 in its longitudinal direction protrudes below the connection member 27. Such protruding portion has, in its end portion, an operation hole 51 into which a tool or the like can be inserted. A user of the wire gripper 1 uses the tool or the like inserted into the operation hole 51 and operates the operation lever 41 so as to be rotated around the rotation shaft 53.

A contact part 43 is integrally formed with the operation lever 41 in one end portion thereof opposite to the operation hole 51. The contact part 43 is integrally rotated with the operation lever 41. Therefore, rotation operation of the operation lever 41 causes the contact part 43 to move along an arc-shaped path around the rotation shaft 53.

The contact part 43 can come in contact with a part of the second link arm 7B, specifically between the second shaft 23 and the fourth shaft 33. At this time, a surface of the second link arm 7B coming in contact with the contact part 43 corresponds to a surface of the second link arm 7B on its downstream side in the gripping direction.

The ratchet mechanism 47 is provided between the connection member 27 and the operation lever 41. The ratchet mechanism 47 can hold the operation lever 41 so that the operation lever 41 does not rotate relative to the connection member 27.

Specifically, as illustrated in FIG. 2 and FIG. 3, the ratchet mechanism 47 includes a ratchet wheel 61, a claw member 63, and a pressing portion 59.

The ratchet wheel 61 is fixed to the connection member 27. The ratchet wheel 61 has a plurality of teeth 71 which radially protrudes. The plurality of teeth 71 is arranged side by side on an outer circumference of the ratchet wheel 61 along its circumferential direction. An axis of the ratchet wheel 61 coincides with that of the rotation shaft 53.

The claw member 63 is supported by the operation lever 41 so as to be rotated around a support shaft 73. The claw member 63 can be coupled with the ratchet wheel 61. The claw member 63 has a first claw 75 and a second claw 76. The first claw 75 and the second claw 76 each have substantially the same shape, and each have substantially a symmetrical shape. Each of the first claw 75 and the second claw 76 can be meshed with the respective teeth 71 of the ratchet wheel 61. The pressing portion 59 presses one of the first claw 75 and the second claw 76 so as to be meshed with the teeth 71. FIG. 2 and FIG. 3 illustrate an example in which the pressing portion 59 presses the first claw 75 between the adjacent the teeth 71.

The pressing portion 59 is provided in the operation lever 41. The pressing portion 59 is disposed on a side opposite to the ratchet wheel 61 across the claw member 63. The pressing portion 59 consecutively presses the claw member 63 toward the support shaft 73.

The pressing portion 59 has a spring (elastic member) 81 and a steel ball (interposition member) 83. The spring 81 is disposed inside a spring hole formed in the operation lever 41. The steel ball 83 is provided between the spring 81 and the claw member 63. The pressing portion 59 presses the claw member 63 toward the ratchet wheel 61 side through the steel ball 83 using a biasing force of the spring 81.

A pointed corner portion 78 is formed in the claw member 63 on its one side close to the steel ball 83. The claw member 63 has a first pressed surface 79 and a second pressed surface 80 arranged across the corner portion 78. The steel ball 83 can press these pressed surfaces 79 and 80. The pressed surfaces 79 and 80 are oriented diagonally to a direction in which the spring 81 presses the steel ball 83, throughout a whole range of a rotation stroke of the claw member 63. Thus, a spring force of the pressing portion 59 is converted into a force that rotates the claw member 63 in any one of directions.

The claw member 63 further has a switching lever 77. The claw member 63 is rotated around the support shaft 73 by rotation operation of the switching lever 77. As a result, the corner portion 78 passes over the steel ball 83, and then the pressed surfaces 79 and 80 pressed by the steel ball 83 are switched. Therefore, a rotational direction in which the claw member 63 is biased by the spring 81 is switched.

FIG. 4 illustrates a state in which the moveable-side wire gripping portion 11 grips and holds the linear body 3 between the moveable-side wire gripping portion 11 and the stationary-side wire gripping portion 9. FIG. 5 corresponds to a state of the regulating portion 13 indicated by a solid line of FIG. 4. In this state, as illustrated in FIG. 5, the pressing portion 59 presses the first pressed surface 79, so that the first claw 75 is located in the adjacent teeth 71.

When the operation lever 41 is rotated in the clockwise direction with a state of FIG. 5, the first claw 75 passes over the teeth 71 while pressing and contracting the spring 81 of the pressing portion 59. Thus, rotation of the operation lever 41 is allowed. However, because of the small teeth 71, the rotation stroke of the claw member 63 is small even when the claw member 63 is rotated in conjunction with passing of the first claw 75 over the teeth 71. Therefore, the corner portion 78 does not pass over the steel ball 83 even when the first claw 75 passes over the teeth 71.

Thus, the operation lever 41 can be rotated from a position illustrated in FIG. 5 to a position illustrated in FIG. 6. It can be considered that the clockwise direction of the operation lever 41 is a direction in which the contact part 43 approaches the second link arm 7B and also a direction in which the contact part 43 increasingly interferences with the second link arm 7B. The position of the operation lever 41 in FIG. 6 indicates that the contact part 43 comes in contact with the second link arm 7B.

On the other hand, when the operation lever 41 is to be rotated in the counterclockwise direction with the state illustrated in FIG. 5 or FIG. 6, the claw 75 is pressed by the teeth 71 of the ratchet wheel 61 and further meshed with the ratchet wheel 61. Thus, the rotation in the counterclockwise direction is regulated. It can be considered that the counterclockwise direction of the operation lever 41 is a direction in which the contact part 43 is spaced from the second link arm 7B, and also a direction in which the contact part 43 decreasingly interferences with the second link arm 7B.

As such, the ratchet mechanism 47 forms the one-way clutch, so that the operation lever 41 is rotated only in a direction in which the contact part 43 approaches and presses the second link arm 7B.

In the state of FIG. 6, the contact part 43 comes in contact with the second link arm 7B. In such state, when the second link arm 7B is to be rotated around the second shaft 23 in the release direction (the counterclockwise direction in FIG. 6), the contact part 43 blocks the rotation of the second link arm 7B.

The reason of such blocking will be described as follows. As described above, since the connection member 27 forms the parallel link mechanism, a posture of the connection member 27 does not change regardless of rotation of the second link arm 7B. Accordingly, when the connection member 27 is considered as a reference, along with rotation of the second link arm 7B around the second shaft 23 in the counterclockwise direction illustrated in FIG. 6, the second link arm 7B is necessarily relatively rotated around the fourth shaft 33 in the counterclockwise direction. However, FIG. 6 makes it clear that such relative rotation is regulated by the contact part 43. After all, in the state of FIG. 6, the contact part 43 blocks rotation of the second link arm 7B around the second shaft 23 in the release direction.

As such, the ratchet mechanism 47 holds the operation lever 41 so as not to be rotated even when an external force of rotation in a certain direction. This results in holding of the position of the moveable-side wire gripping portion 11. Accordingly, the ratchet mechanism 47 may be referred to as a holding portion.

In the operation lever 41, a distance from the rotation shaft 53 to the operation hole 51 is shorter than that from the rotation shaft 53 to the contact part 43. Therefore, the contact part 43 is strongly rotated in the clockwise direction utilizing the principle of leverage, which can tightly regulate the second link arm 7B so as not to be rotated in the release direction.

Furthermore, rotation of the operation lever 41 in the direction in which the contact part 43 is spaced from second link arm 7B is blocked by the ratchet mechanism 47 that functions as the one-way clutch. Therefore, the state illustrated in FIG. 6 is a double locking state by the operation lever 41 (the contact part 43) and the ratchet mechanism 47.

The posture of the second link arm 7B while gripping the linear body 3 between the stationary-side wire gripping portion 9 and the moveable-side wire gripping portion 11 varies depending on the thickness of the linear body 3. However, in the present embodiment, the regulating portion 13 is formed as the one-way clutch; therefore, rotation of the operation lever 41 from its operation position in the counterclockwise direction can be blocked even at any operation position of the operation lover 41. This can achieve the above-described double locking flexibly depending on changes in the thickness of the linear body 3.

In the state of FIG. 6, it is assumed that the claw member 63 is rotated while pressing up the switching lever 77. After the corner portion 78 presses and passes through the steel ball 83 along with rotation of the claw member 63, the steel ball 83 of the pressing portion 59 presses the second pressed surface 80, not the first pressed surface 79. As a result, the rotation direction in which the claw member 63 is biased by the spring 81 is reversed. Thus, the claw member 63 is pressed, so that the first claw 75 is spaced from the teeth 71 and the second claw 76 alternatively enters between the adjacent teeth 71, as indicated by a chain line of FIG. 6. Since the second claw 76 functions symmetrically with the first claw 75, the ratchet mechanism 47 conversely functions as the one-way clutch that only allows rotation in a direction in which the contact part 43 is spaced from the second link arm 7B.

In this state, the second link arm 7B can be rotated around the second shaft 23 in the counterclockwise direction of FIG. 6. In conjunction with such rotation, the contact part 43 is pressed by the second link arm 7B; accordingly, the operation lever 41 is rotated automatically in the counterclockwise direction from the state of FIG. 6. As such, the operation lever 41 is rotated in conjunction with rotation of the second link arm 7B.

Next, a work in using the wire gripper 1 as described above, that is, a work for mounting the wire gripper 1 to the linear body 3 and removing the wire gripper 1 from the linear body 3 will be described.

Firstly, the moveable-side wire gripping portion 11 is sufficiently spaced from the stationary-side wire gripping portion 9, and then the operation lever 41 of the regulating portion 13 is rotated as necessary and positioned at a first operating position P1 illustrated in FIG. 1. The switching lever 77 is operated and the claw member 61 is switched in advance, so that the first claw 75 is meshed with the ratchet wheel 61 as in the state of FIG. 3. Such state means that the ratchet mechanism 47 allows only rotation of the operation lever 41 in the clockwise direction.

Subsequently, the wire gripper 1 is placed at a predetermined part of the linear body 3, and the linear body 3 passes through a space between the stationary-side wire gripping portion 9 and the moveable-side wire gripping portion 11. In other words, the wire gripper 1 is suspended from the predetermined part of the linear body 3 by accommodating an upper part of the linear body 3 in the first groove 15 of the stationary-side wire gripping portion 9.

Next, the above-described wire tensioning device is used to apply a pulling force in a direction indicated by an outlined white arrow in FIG. 1 to the connection member 27. As such, when the connection member 27 is pulled, the second link arm 7B connected to the connection member 27 is rotated in the gripping direction. Along with rotation of the second link arm 7B in the gripping direction, the linear body 3 is sandwiched by the stationary-side wire gripping portion 9 and the moveable-side wire gripping portion 11, as illustrated in FIG. 4. This can achieve mechanical fixation of the wire gripper 1 with respect to the linear body 3.

As long as the connection member 27 keeps its pulling state in the direction indicated by the outlined white arrow direction in FIG. 1, the wire gripper 1 keeps its state being tightly mounted to the linear body 3. However, when the above-described pulling force is not sufficiently obtained for some reason, the second link arm 7B may be rotated in the release direction and the wire gripper 1 may be unintendedly removed from the linear body 3.

In this regard, in the present embodiment, with a predetermined operation, the regulating portion 13 can regulate the rotation of the second link arm 7B in the release direction so that the wire gripper 1 is not removed from the linear body 3. Specifically, the operation lever 41 of the regulating portion 13 is rotated from the first operating position P1 illustrated in FIG. 5 to a second operation position P2 illustrated in FIG. 6

In the state of FIG. 6, the contact part 43 blocks deformation of the parallel link mechanism to allow rotation of the second link arm 7B in the release direction, as described above. The ratchet mechanism 47 functioning as the one-way clutch blocks rotation of the operation lever 41 in the direction in which the contact part 43 is spaced from the second link arm 7B. As a result, unintended rotation of the second link arm 7B in the release direction can be certainly prevented by the double locking. This can certainly keep a state in which the wire gripper 1 is mounted to the linear body 3.

As such, in the present embodiment, double locking operation can be achieved with one action in which the operation lever 41 is rotated. This can achieve easy operation. In addition, locking can be achieved only by rotation of the operation lever 41 by a small angle, compared to rotation of the screw shaft many times as described in the background art. The angle required for rotation of the operation lever 41 is less than one rotation (less than 360°), preferably, less than 180°, depending on a situation. Thus, workability is excellent, and a work time can be shortened.

When the wire gripper 1 is removed from the linear body 3, the switching lever 77 is firstly operated to switch the claw member 63 so that the second claw 76 is meshed with the ratchet wheel 61 as in a state indicated by the chain line of FIG. 6. Such state means that the ratchet mechanism 47 allows only rotation of the operation lever 41 in the counterclockwise direction. Then, the operation lever 41 is rotated in the counterclockwise direction. After that, since the above-described steps are simply required to be executed in reverse, detailed description is omitted.

As described above, the wire gripper 1 of the present embodiment includes the main body 5, the second link arm 7B, the connection member 27, the stationary-side wire gripping portion 9, and the moveable-side wire gripping portion 11. The second link arm 7B is rotatably supported by the main body 5. The connection member 27 is connected to the second link arm 7B. The stationary-side wire gripping portion 9 is provided in the main body 5. The moveable-side wire gripping portion 11 is connected to the second link arm 7B so as to face the stationary-side wire gripping portion 9, and is movable in a direction approaching or being spaced from the stationary-side wire gripping portion 9 in conjunction with movement of the connection member 27. The wire gripper 1 grips and holds the linear body 3 by the stationary-side wire gripping portion 9 and the moveable-side wire gripping portion 11. The wire gripper 1 includes the ratchet mechanism 47 that blocks rotation of the operation lever 41 in conjunction with rotation of the second link arm 7B in one direction and allows reverse rotation in the other direction. The ratchet mechanism 47 blocks rotation, thereby regulating movement of the moveable-side wire gripping portion 11 in the direction spaced from the stationary-side wire gripping portion 9.

Accordingly, the ratchet mechanism 47 is used to substantially regulate rotation of the second link arm 7B. This leads to excellent workability. When the thickness of the linear body varies, rotation can be certainly regulated.

The wire gripper 1 of the present embodiment includes the operation lever 41 rotatably provided in the connection member 27. The operation lever 41 has the contact part 43 capable of coming in contact with the second link arm 7B. The contact part 43 moves along the arc-shaped path in accordance with the operation of the operation lever 41. When the contact part 43 is in contact with the second link arm 7B, the second link arm 7B presses the contact part 43 in conjunction with movement of the moveable-side wire gripping portion 11 in the direction being spaced from the stationary-side wire gripping portion 9. The ratchet mechanism 47 blocks rotation of the operation lever 41 along with pressing of the contact part 43 by the second link arm 7B, and allows reverse rotation.

This can easily achieve the double locking by the contact part 43 and the ratchet mechanism 47.

The wire gripper 1 of the present embodiment can execute a switching operation for reversing the direction in which the ratchet mechanism 47 blocks rotation.

This can easily release a rotation regulation of the second link arm 7B.

In the wire gripper 1 of the present embodiment, the ratchet mechanism 47 includes the ratchet wheel 61, the claw member 63, and the spring 81. The ratchet wheel 61 is disposed fixedly to the connection member 27. The claw member 63 is rotatably supported with respect to the operation lever 41. The spring 81 causes an elastic force working on the claw member 63.

This can achieve the one-way clutch with a simple configuration.

The wire gripper 1 of the present embodiment includes the two link arms 7. The main body 5, the two link arms 7, and the connection member 27 form the parallel link mechanism.

Accordingly, even when the link arm 7 is rotated, the posture of the connection member 27 does not change. This can certainly regulate the rotation of the link arms 7 with a simple configuration.

Next, modifications of the above-described embodiment will be described. In the modifications illustrated in subsequent drawings after FIG. 7, members identical or similar to those of the above-described embodiment may not be described and instead the same reference signs as in the above-described embodiment are given on the drawings.

Figure 7:
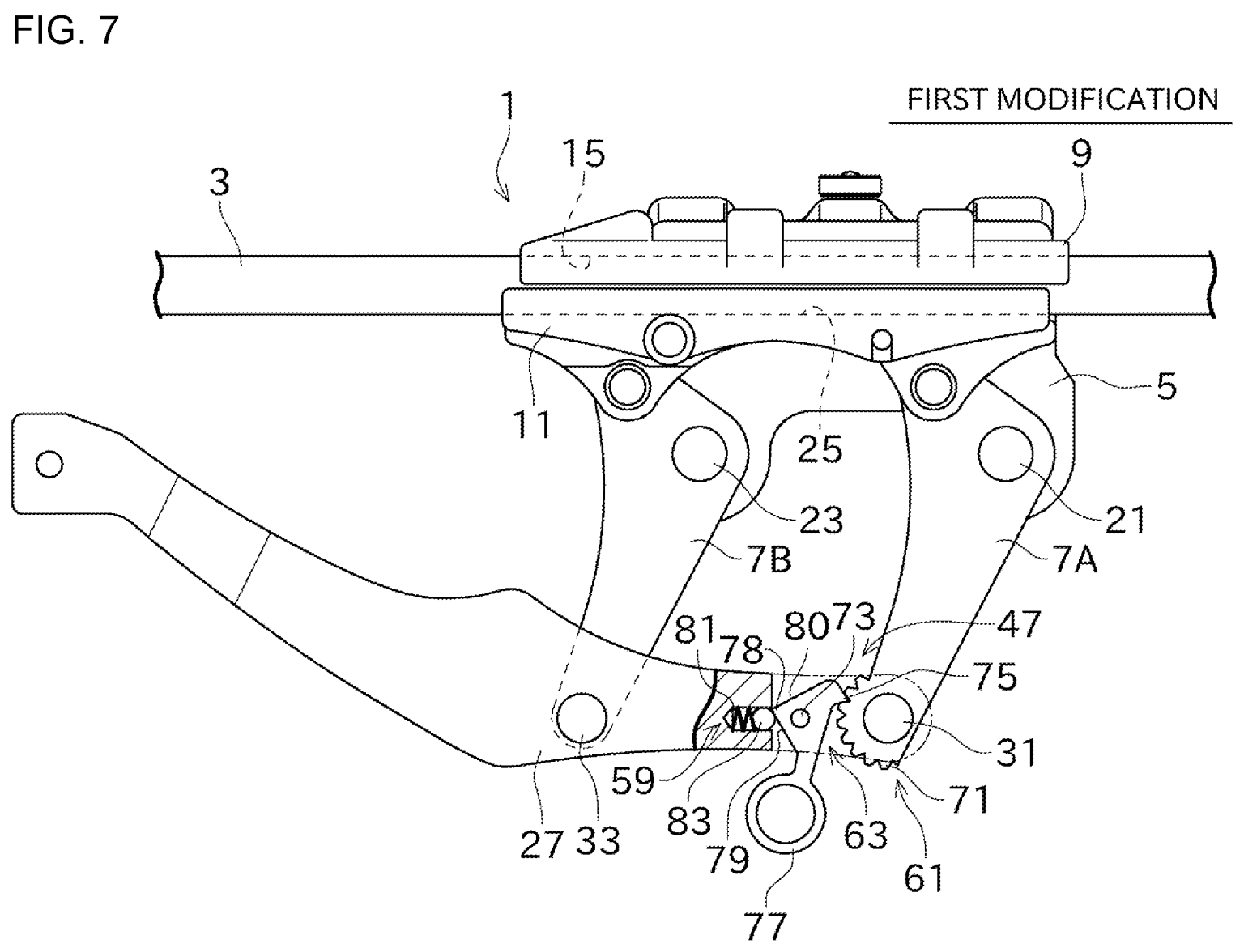

In a first modification of FIG. 7, the ratchet mechanism 47 is disposed between the connection member 27 and the link arm 7.

In a configuration of FIG. 7, the claw member 63 is rotatably supported by the connection member 27. The pressing portion 59 is also disposed in the connection member 27. The claw member 63 has one claw 75. The ratchet wheel 61 is integrally formed with the first link arm 7A at its lower end. The ratchet wheel 61 is formed as an arc-shaped gear. An axis of the ratchet wheel 61 coincides with that of the third shaft 31.

When the posture of the claw member 63 is in a state illustrated in FIG. 7, a spring force of the spring 81 included in the pressing portion 59 causes the claw member 63 to be rotated in a direction in which the claw 75 is meshed with the ratchet wheel 61. Therefore, in substantially the same principle as the ratchet mechanism 47 illustrated in FIG. 3, the ratchet mechanism 47 of the present modification functions as the one-way clutch that blocks rotation of the first link arm 7A relative to the connection member 27 around the third shaft 31 in the counterclockwise direction as illustrated in FIG. 7 and allows relative rotation in the clockwise direction. Therefore, the rotation of the first link arm 7A around the first shaft 21 in the counterclockwise direction (release direction) is regulated.

It is assumed that the force is applied to the switching lever 77 and the posture of the claw member 63 is switched from the state illustrated in FIG. 7 so that the corner portion 78 passes over the steel ball 83. In this case, the spring 81 of the pressing portion 59 causes the claw member 63 to be rotated in a direction in which meshing between the claw 75 and the ratchet wheel 61 is released. Thus, the above-described regulation by the ratchet mechanism 47 is released, and the first link arm 7A can be freely rotated around the first shaft 21 in opposite directions.

As such, the ratchet mechanism 47 blocks the rotation of the first link arm 7A in one direction, and allows reverse rotation in the other direction.

Figure 8:
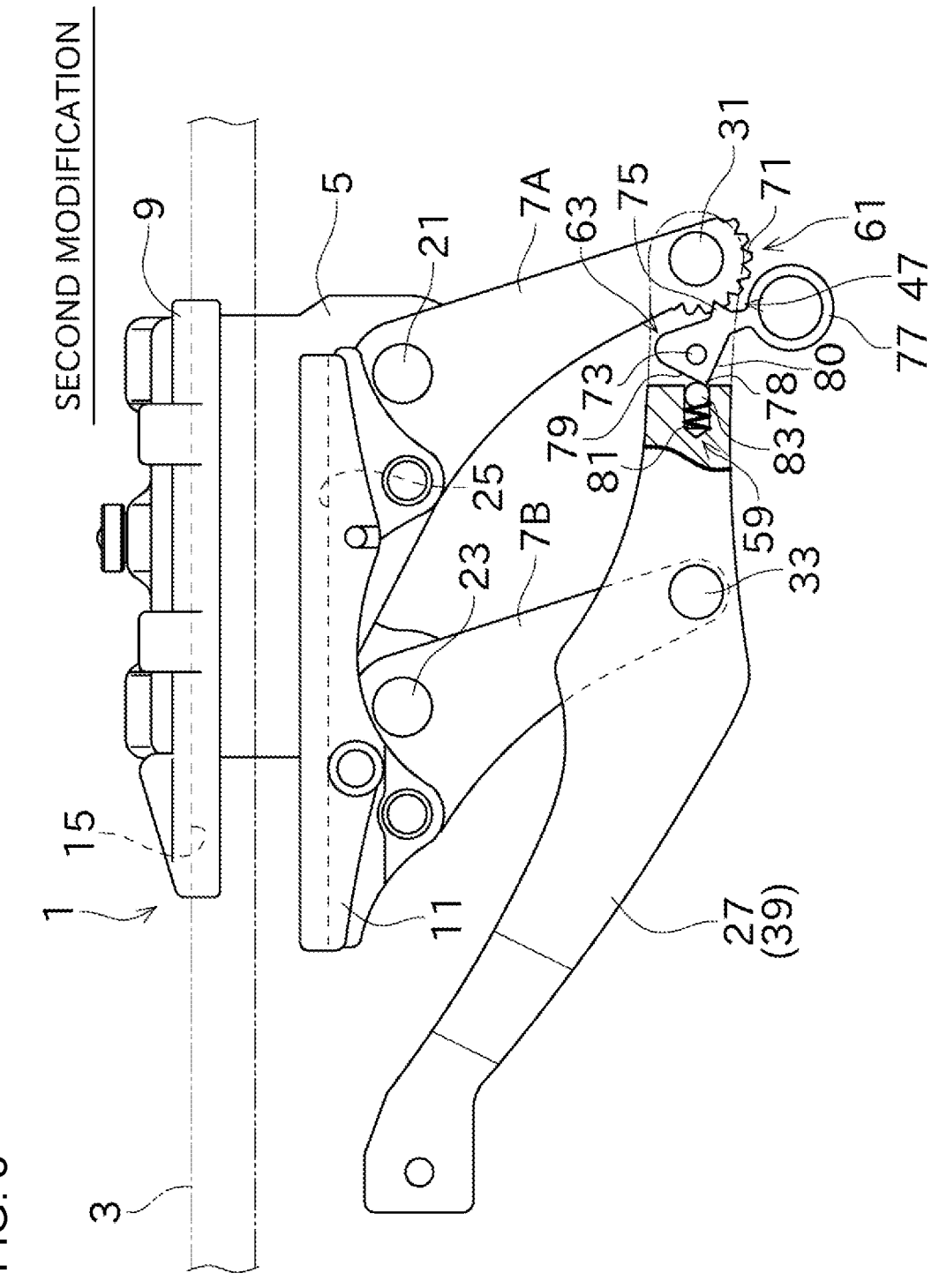
FIG. 8 is a side view of a second modification of a wire gripper.

In a second modification illustrated in FIG. 8, a direction in which the ratchet mechanism 47 functioning as the one-way clutch blocks the rotation may be opposite to that of the above-described first modification. In the present modification, rotation of the first link arm 7A around the first shaft 21 in the clockwise direction (gripping direction) can be regulated. As illustrated in FIG. 8, a state in which the moveable-side wire gripping portion 11 is spaced from the stationary-side wire gripping portion 9 is kept in a mechanical manner, which facilitates the work for positioning the linear body 3 in such space between the moveable-side wire gripping portion 11 and the stationary-side wire gripping portion 9.

Although a preferred embodiment and preferred modifications of the present invention have been described as above, the following modified embodiments are allowable.

In the embodiment illustrated in FIG. 3 and the like, a biasing member (not illustrated) that biases the rotation of the operation lever 41 in a direction in which the contact part 43 approaches the second link arm 7B may be provided. This biasing member may be, for example, a twist coil spring in which a spring wire is fixed to the connection member 27 and the operation lever 41. The biasing member has its force in which the first claw 75 can pass over the teeth 71. In this case, from a state of FIG. 1, only pulling of the connection member 27 in the direction indicated by the outlined white arrow can automatically lead to a state of FIG. 6. Thus, the rotation operation of the operation lever 41 can be eliminated, which facilitates the work.

In a configuration of FIG. 3, a direction in which the rotation of the claw member 63 is biased by the pressing portion 59 (in other words, by the spring 81) may be unswitchable. In this case, the second claw 76 can be eliminated. In addition, the spring 81 may be changed to the twist coil spring, for example.

The regulating portion 13 may be applied to the first link arm 7A, instead of the second link arm 7B in the two link arms 7. Three link arms 7 may be allowable.

The contact part 43 is not integrally formed with the operation lever 41, and may be alternatively formed as a component separated from the operation lever 41.

The stationary-side wire gripping portion 9 is not integrally formed with the main body 5, and may be alternatively formed as a component separated from the main body 5.

The linear body 3 is not limited to an electric wire and a wire, and may be other elongated components.

It is clear that the present invention may include multiple modified embodiments and variations in view of the above-described teachings. Therefore, it is noted that the present invention may be implemented by methods other than that described in claims of this specification.

DESCRIPTION OF THE REFERENCE NUMERALS 1 wire gripper (gripping tool)
5 main body
7 link arm (link member)
7A first link arm
7B second link arm (one of link members)
9 stationary-side wire gripping portion (stationary-side gripping portion)
11 moveable-side wire gripping portion (moveable-side gripping portion)
27 connection member
41 operation lever (operation portion)
43 contact part
47 ratchet mechanism (one-way clutch)
59 pressing portion
61 ratchet wheel
63 claw member

The invention claimed is:
1. A gripping tool, comprising:
a main body;
a link member rotatably supported by the main body;
a connection member connected to the link member;
a stationary-side gripping portion provided in the main body;
a moveable-side gripping portion connected to the link member to face the stationary-side gripping portion, the moveable-side gripping portion being movable in a direction approaching or being spaced away from the stationary-side gripping portion in conjunction with rotation of the connection member, the stationary-side gripping portion and the moveable-side gripping portion gripping and holding a linear body; and
an operation portion rotatably provided in the connection member, wherein the gripping tool includes a one-way clutch that blocks rotation of the link member or another member in conjunction with rotation of the link member in one direction and allows reverse rotation in an other direction, wherein rotation blocking by the one-way clutch regulates movement of the moveable-side gripping portion in one of a direction approaching the stationary-side gripping portion and a direction being spaced from the stationary-side gripping portion, wherein the operation portion has a contact part capable of coming in contact with the link member, wherein the contact part moves along an arc-shaped path in accordance with operation of the operation portion, wherein the link member presses the contact part in conjunction with the movement of the moveable-side gripping portion in a direction being spaced from the stationary-side gripping portion, when the contact part comes in contact with the link member, and wherein the one-way clutch blocks rotation of the operation portion in conjunction with pressing of the contact part by the link member, and allows reverse rotation of the operation portion.

2. The gripping tool according to claim 1, further comprising:

a biasing member that biases the rotation of the operation portion in a direction in which the contact part approaches the link member.

3. The gripping tool according to claim 1, wherein a switching operation that releases rotation blocking by the one-way clutch or a switching operation that reverses a direction of the rotation blocking is executable.

4. The gripping tool according to claim 1, wherein the one-way clutch includes:

a ratchet wheel disposed fixedly to the connection member;

a claw member rotatably supported with respect to the operation portion; and an elastic member that causes an elastic force working on the claw member.

5. A gripping tool, comprising:

a main body;

a plurality of link members rotatably supported by the main body;

a connection member connected to at least one of the link members;

a stationary-side gripping portion provided in the main body;

a moveable-side gripping portion connected to at least one of the link members to face the stationary-side gripping portion, the moveable-side gripping portion being movable in a direction approaching or being spaced away from the stationary-side gripping portion in conjunction with rotation of the connection member, the stationary-side gripping portion and the moveable-side gripping portion gripping and holding a linear body; and an operation portion rotatably provided in the connection member, wherein the gripping tool includes a one-way clutch that blocks rotation of at least one of the link members or another member in conjunction with rotation of at least one of the link members in one direction and allows reverse rotation in an other direction, wherein rotation blocking by the one-way clutch regulates movement of the moveable-side gripping portion in one of a direction approaching the stationary-side gripping portion and a direction being spaced from the stationary-side gripping portion, wherein the main body, at least one of the link members, and the connection member form a parallel link mechanism, wherein the operation portion has a contact part capable of coming in contact with at least one of the link members, wherein the contact part moves along an arc-shaped path in accordance with operation of the operation portion, wherein at least one of the link members presses the contact part in conjunction with the movement of the moveable-side gripping portion in a direction being spaced from the stationary-side gripping portion, when the contact part comes in contact with at least one of the link members, and wherein the one-way clutch blocks rotation of the operation portion in conjunction with pressing of the contact part by at least one of the link members, and allows reverse rotation of the operation portion.

6. The gripping tool according to claim 5, further comprising:

a biasing member that biases the rotation of the operation portion in a direction in which the contact part approaches at least one of the link members.

7. The gripping tool according to claim 5, wherein a switching operation that releases rotation blocking by the one-way clutch or a switching operation that reverses a direction of the rotation blocking is executable.

8. The gripping tool according to claim 5, wherein the one-way clutch includes:

a ratchet wheel disposed fixedly to the connection member;

a claw member rotatably supported with respect to the operation portion; and an elastic member that causes an elastic force working on the claw member.

* * * * *